United States Patent
Noda et al.

(10) Patent No.: US 12,515,258 B2
(45) Date of Patent: Jan. 6, 2026

(54) METHOD FOR MANUFACTURING ROLL MOLD, ROLL MOLD MANUFACTURING APPARATUS, NON-TRANSITORY COMPUTER READABLE MEDIUM, AND ROLL MOLD

(71) Applicant: DEXERIALS CORPORATION, Shimotsuke (JP)

(72) Inventors: Kazuhiko Noda, Shimotsuke (JP); Katsuhiro Doi, Shimotsuke (JP); Kyoko Sakurai, Shimotsuke (JP); Asahiko Nogami, Shimotsuke (JP); Mitsuo Arima, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 638 days.

(21) Appl. No.: 17/784,685

(22) PCT Filed: Dec. 8, 2020

(86) PCT No.: PCT/JP2020/045706
§ 371 (c)(1),
(2) Date: Jun. 13, 2022

(87) PCT Pub. No.: WO2021/124990
PCT Pub. Date: Jun. 24, 2021

(65) Prior Publication Data
US 2023/0025421 A1    Jan. 26, 2023

(30) Foreign Application Priority Data
Dec. 20, 2019    (JP) ................. 2019-229889

(51) Int. Cl.
*B23B 1/00*    (2006.01)
*B23B 5/36*    (2006.01)

(52) U.S. Cl.
CPC . *B23B 5/36* (2013.01); *B23B 1/00* (2013.01)

(58) Field of Classification Search
CPC .... B23B 1/00; B23B 5/08; B23B 5/40; B23B 5/48; B23B 5/46; B23B 25/02;
(Continued)

(56) References Cited

U.S. PATENT DOCUMENTS 8,215,211 B2 *    7/2012    Akiyama ................ B23B 3/162
                                                            82/1.11
8,413,557 B2 *    4/2013    Akiyama .................. B23B 5/48
                                                            82/70.1
(Continued)

FOREIGN PATENT DOCUMENTS

CN        101301776 A      11/2008
DE        202004011815 U1    2/2005
(Continued)

OTHER PUBLICATIONS

Combined Chinese Office Action and Search Report issued Jun. 11, 2024 in corresponding Chinese Patent Application No. 202080081582.4 (with machine English translation), 13 pages.
(Continued)

*Primary Examiner* — Nicole N Ramos
(74) *Attorney, Agent, or Firm* — Element IP, PLC

(57) ABSTRACT

A method for manufacturing a roll mold by cutting a roll, includes generating a control waveform based on a signal corresponding to a rotary position of the roll, and making a plurality of cuts on a surface of the roll by, while the roll is rotated, reciprocating a cutting blade in a radial direction of the roll in accordance with the control waveform. Making the plurality of cuts includes at each of a plurality of predetermined locations, making a predetermined number of cuts of predetermined depth based on the control waveform. Generating the control waveform includes generating a
(Continued)

control waveform dictating that, when multiple cuts are made at a predetermined location, each subsequent cut will have a smaller depth than a preceding cut.

11 Claims, 13 Drawing Sheets

(58) Field of Classification Search
CPC ....... B23B 25/06; B23B 27/22; B23B 29/125; B23Q 15/0075; B23Q 15/013; B23Q 15/14; B23Q 15/007; B23Q 15/06; Y10T 82/10; Y10T 82/20; Y10T 82/2502; Y10T 82/2533; Y10T 82/2541
See application file for complete search history.

(56) References Cited

U.S. PATENT DOCUMENTS

| 10,675,688 | B2* | 6/2020 | Akiyama | ................ B23D 11/00 |
| 2007/0251360 | A1* | 11/2007 | Akiyama | ................... B23C 3/30 82/53.1 |
| 2008/0011132 | A1* | 1/2008 | Akiyama | ................... B23C 3/34 82/147 |
| 2008/0307935 | A1* | 12/2008 | Akiyama | ............. G05B 19/182 82/1.11 |
| 2010/0011920 | A1* | 1/2010 | Akiyama | .................. B23B 1/00 82/1.11 |
| 2011/0277603 | A1* | 11/2011 | Uchimura | ................. B23B 5/08 82/159 |
| 2018/0281139 | A1* | 10/2018 | Yamamoto | .............. B23B 13/08 |
| 2019/0061008 | A1* | 2/2019 | Akiyama | ............... B23D 11/00 |

FOREIGN PATENT DOCUMENTS

| JP | 2012013748 A | 1/2012 | |
| WO | WO-2010098389 A1 * | 9/2010 | ............... B23B 1/00 |
| WO | WO-2013054832 A1 * | 4/2013 | ............. B23B 27/20 |

OTHER PUBLICATIONS

International Search Report issued Feb. 9, 2021 in PCT/JP2020/045706 (with English translation), 4 pages.
Office Action issued Nov. 15, 2024, in corresponding Chinese Patent Application No. 202080081582.4 (with machine English translation), 12 pages.
Written Opinion issued Feb. 9, 2021 in PCT/JP2020/045706 (with English translation), 8 pages.
Request for the Submission of an Opinion issued Nov. 13, 2023 in Korean Patent Application No. 10-2022-7015663 (with English translation), 6 pages.
Office Action issued Apr. 16, 2025, in corresponding Chinese Patent Application No. 202080081582.4, (with machine English translation), 18 pages.
Office Action issued Jun. 16, 2025, in corresponding Chinese Patent Application No. 202080081582.4 (with machine English translation), 15 pages.

* cited by examiner

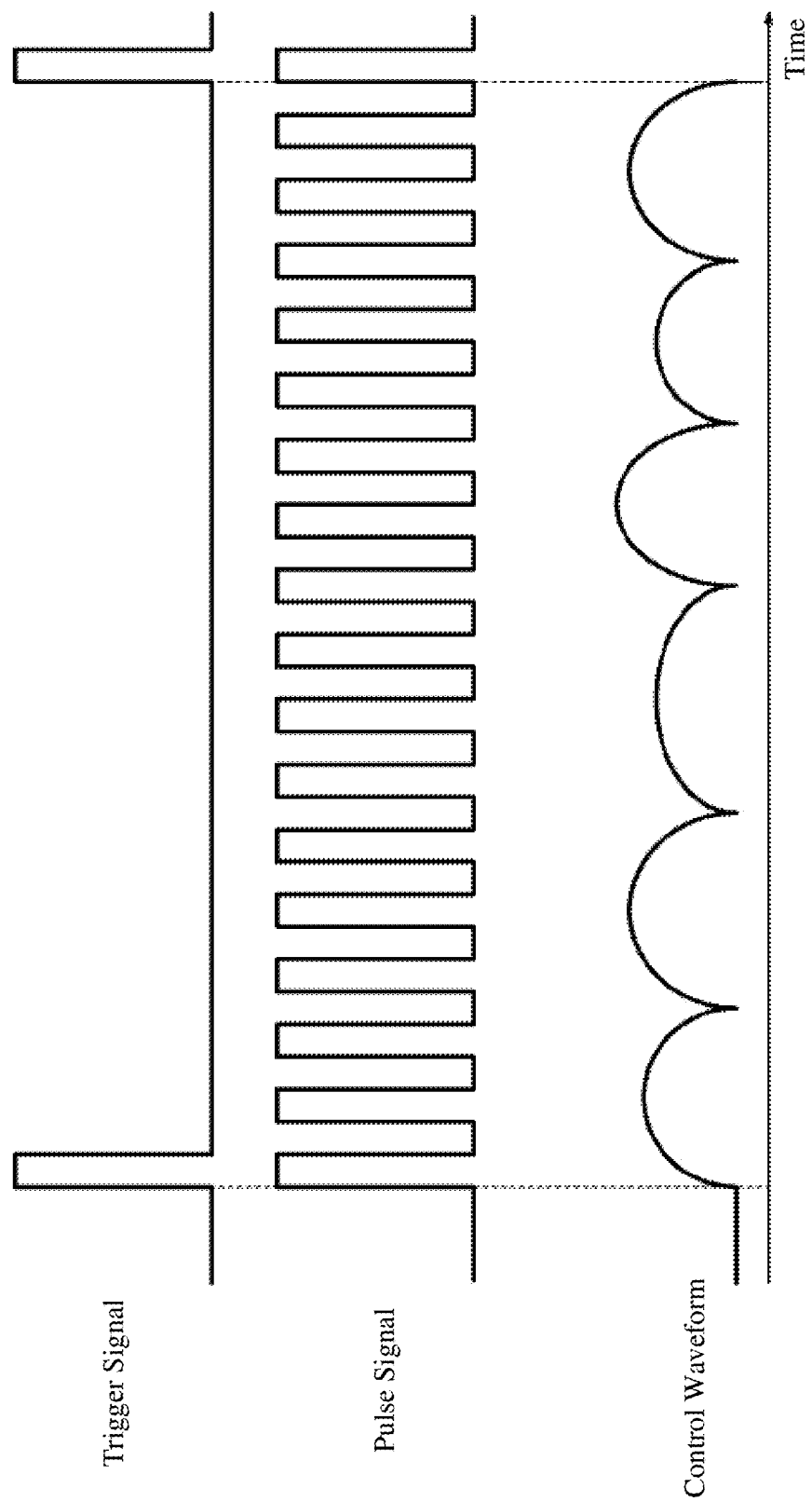

METHOD FOR MANUFACTURING ROLL MOLD, ROLL MOLD MANUFACTURING APPARATUS, NON-TRANSITORY COMPUTER READABLE MEDIUM, AND ROLL MOLD

TECHNICAL FIELD

The present invention claims priority to Japanese Patent Application 2019-229889, filed in Japan on Dec. 20, 2019, and incorporates the entire disclosure of the previous application herein by reference.

The present invention relates to a roll mold manufacturing method, a roll mold manufacturing apparatus, and a program.

BACKGROUND ART

Microlens arrays, wherein large numbers of microlenses are arranged in two dimensions, are used in a variety of applications such as diffusing plates, diffusing sheets, and screens of heads-up displays. One method for manufacturing a microlens array that is highly suitable for mass production is a method of forming a pattern of the inverted shape of a standard pattern for the microlens array (hereinafter termed a "transfer pattern") on a mold surface, transferring the transfer pattern, formed on the mold surface, to resin that is coated onto a substrate, and curing the resin after the transfer. The cured resin can be cut as necessary to manufacture the desired microlens array.

In the method set forth above, by using a roll-to-roll method using a roll mold, wherein the transfer pattern is formed on the surface of a roll of a cylindrical or circular column shape, it is possible to manufacture microlens arrays with high uniformity of quality and excellent mass production performance.

As a method for manufacturing the roll mold described above, there is a method wherein the surface of the cylindrical or circular column-shaped roll is cut using a cutting blade to form the transfer pattern on the roll (referencing, for example, Patent Document 1). When the transfer pattern is formed by cutting the roll, sometimes protrusions, known as burrs, are formed on the surface of the roll through cutting. Transferring using a transfer pattern having burrs will transfer a shape which includes the burrs and is not the desired microlens array pattern, which is known to negatively affect the quality of the microlens array that is manufactured. In particular, if the process height between the recessed and raised portions of the transfer pattern is in excess of 20 μm, the burrs that are produced are known to have an adverse effect on the optical performance of the microlens array.

CITATION LIST

Patent Literature

Patent Document 1: Japanese Unexamined Patent Application Publication No. 2012-13748

SUMMARY OF THE INVENTION

Technical Problem

To prevent production of the burrs described above, there is a method for forming by repetitively cutting the roll multiple times, to cut the holes to the desired depth. In this method, the cutting depth for cutting the roll is gradually decreased, making it possible to suppress the production of burrs. However, in this method it is necessary to cut the same cutting location accurately a plurality of times, and, conventionally, there has not been adequate research regarding technologies for accurately cutting the same location a plurality of times.

In contemplation of the problem set forth above, the object of the present invention is to provide a roll mold manufacturing method for manufacturing a roll mold wherein a plurality of cut holes are formed by cutting prescribed cutting locations accurately a plurality of times, and to provide a roll mold manufacturing apparatus and program.

Solution to Problem

A method for roll mold manufacturing according to one embodiment is:
a roll mold manufacturing method in a roll mold manufacturing apparatus including: a rotating device for rotating the cylindrical or circular column-shaped roll in the circumferential direction, equipped with a rotary encoder for outputting a signal in accordance with a rotary position of the roll; and a cutting tool stage, able to move in the radial direction of the roll, for holding a cutting blade that is able to reciprocate in the radial direction of the roll, including:
a generating step for generating, based on a signal outputted from the rotary encoder, a control waveform indicating a movement pattern of the cutting blade which causes the cutting blade to reciprocate in the radial direction of the roll at a position corresponding to a predetermined cutting location on the surface of the roll; and
a cutting step for moving the cutting tool stage in the radial direction of the roll such that the cutting blade reciprocates in the radial direction of the roll in accordance with the control waveform and that a cutting process for cutting the predetermined location once or a plurality of times with a predetermined cutting depth by the cutting blade that moves in the reciprocating motion, is performed a plurality of times, wherein:
in the cutting step, the cutting tool stage is moved in the radial direction of the roll such that the cutting depth in the cutting process is smaller than the cutting depth in the cutting process that was immediately prior to the cutting process.

A roll mold manufacturing apparatus according to one embodiment is:
a roll mold manufacturing apparatus including: a rotating device for rotating the cylindrical or circular column-shaped roll in the circumferential direction, equipped with a rotary encoder for outputting a signal in accordance with a rotary position of the roll; and a cutting tool stage, able to move in the radial direction of the roll, for holding a cutting blade that is able to reciprocate in the radial direction of the roll, which includes:
a signal generating unit to generate, based on a signal outputted from the rotary encoder, a control waveform indicating a movement pattern of the cutting blade which causes the cutting blade to reciprocate in the radial direction of the roll at a position corresponding to a predetermined cutting location on the surface of the roll; and
a controlling unit to move the cutting tool stage in the radial direction of the roll such that the cutting blade reciprocates in the radial direction of the roll in accordance with the control waveform and that a cutting process for cutting the predetermined location once or a plurality of times with a predetermined cutting depth by the cutting blade that moves in the reciprocating motion, is performed a plurality of times, wherein:

the controlling unit causes the cutting tool stage to move in the radial direction of the roll such that the cutting depth in the cutting process is smaller than the cutting depth in the cutting process that was immediately prior to the cutting process.

A program according to one embodiment:

causes execution, on a computer of a roll mold manufacturing apparatus that includes a rotating device for rotating the cylindrical or circular column-shaped roll in the circumferential direction, equipped with a rotary encoder for outputting a signal in accordance with a rotary position of the roll, and a cutting tool stage, able to move in the radial direction of the roll, for holding a cutting blade that is able to reciprocate in the radial direction of the roll, of:

generating processing for generating, based on a signal outputted from the rotary encoder, a control waveform indicating a movement pattern of the cutting blade which causes the cutting blade to reciprocate in the radial direction of the roll at a position corresponding to a predetermined cutting location on the surface of the roll; and cutting processing for causing the cutting tool stage to move in the radial direction of the roll such that the cutting blade reciprocates in the radial direction of the roll in accordance with the control waveform and that a cutting process for cutting the predetermined location once or a plurality of times with a predetermined cutting depth by the cutting blade that moves in the reciprocating motion, is performed a plurality of times, wherein:

in the cutting processing, the cutting tool stage is moved in the radial direction of the roll such that the cutting depth in the cutting process is smaller than the cutting depth in the cutting process that was immediately prior to the cutting process.

Advantageous Effect of Invention

The present invention can provide a roll mold manufacturing method, roll mold manufacturing apparatus, and program, for manufacturing a roll mold in which cut holes with a predetermined depth are formed by cutting predetermined cut locations accurately a plurality of times.

BRIEF DESCRIPTIONS OF DRAWINGS

FIG. 3 is a diagram for explaining generation of the control waveform by the signal generating unit depicted in FIG. 1.

DESCRIPTION OF EMBODIMENTS

Embodiments for carrying out the present invention will be explained below in reference to the drawings. In each figure, identical reference symbols indicate structural elements that are identical or equivalent.

Figure 1:
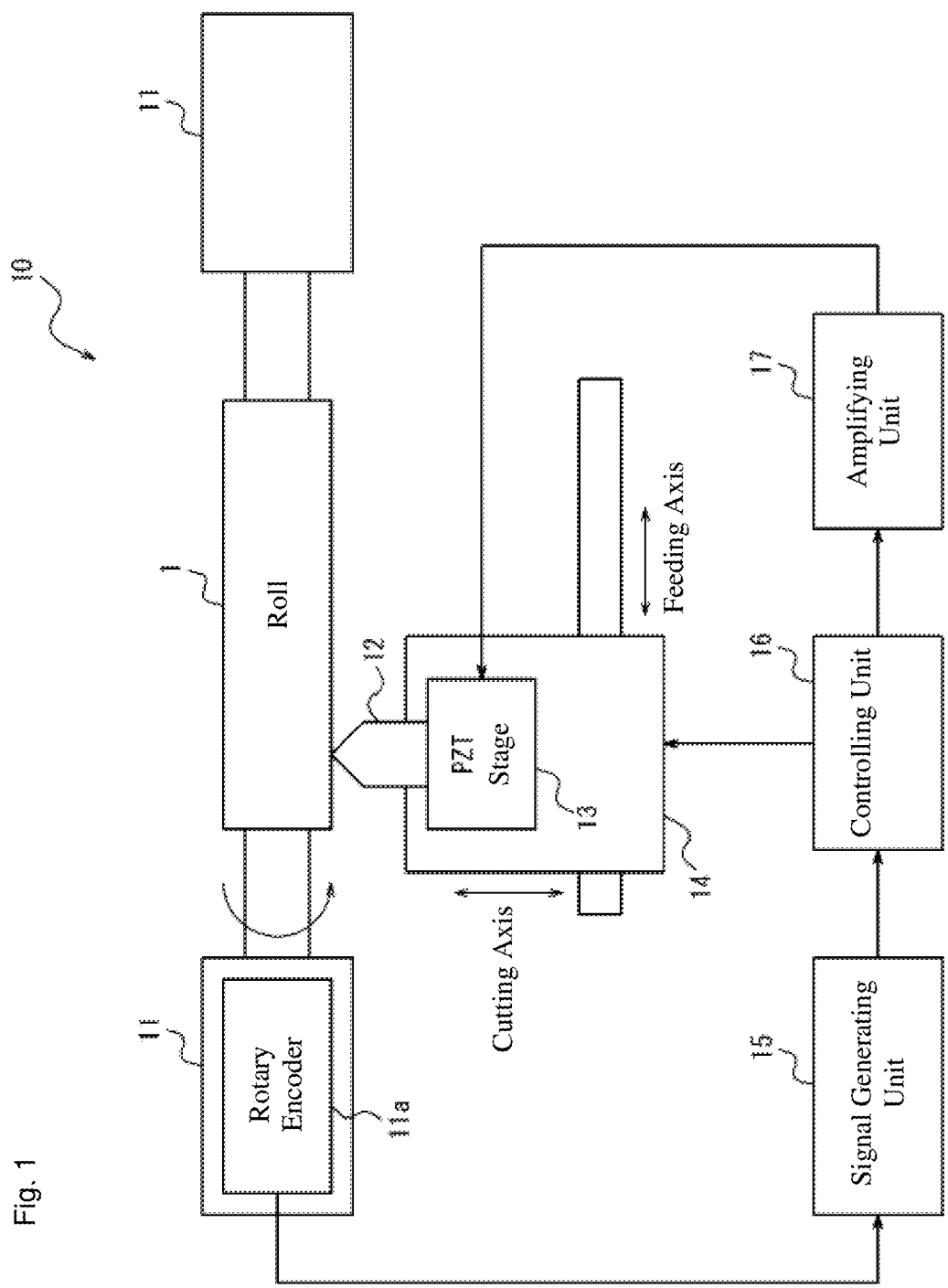
FIG. 1 is a diagram depicting a sample structure of a roll mold manufacturing apparatus according to one embodiment according to the present invention.

FIG. 1 is a diagram showing an example structure for a roll mold manufacturing apparatus 10 according to one embodiment according to the present invention. The roll mold manufacturing apparatus 10 according to the present embodiment is a manufacturing apparatus for manufacturing a roll mold on which a pattern of the inverted shape of a standard pattern for the microlens array (transfer pattern) is formed by cutting a cylindrical or circular column-shaped roll 1.

The roll mold manufacturing apparatus 10 depicted in FIG. 1 includes: a rotating device 11, a cutting blade 12, a PZT stage 13, a cutting tool stage 14, a signal generating unit 15, a controlling unit 16, and an amplifying unit 17.

The rotating device 11 supports the cylindrical or circular column-shaped roll 1 from the axial direction and rotates the roll 1 in the circumferential direction. In the roll 1, the base material is structured from a metal such as SUS (Steel Use Stainless), or the like. The surface of the roll 1 is plated with a machinable plating, such as Ni—P or Cu, or the like. There is no limitation to plating, but rather the roll 1 may be a machinable material such as pure copper, aluminum, or the like. The rotating device 11 is equipped with a rotary encoder 11a.

The rotary encoder 11a outputs, to a signal generating unit 15, a signal depending on the rotary position of the roll 1. The signal that depends on the rotary position of the roll 1 includes a trigger signal that is outputted each time the rotary position of the roll 1 arrives at a prescribed reference position that exists once per rotation, and a pulse signal that is outputted each time the roll 1 rotates by a prescribed amount.

The cutting blade 12 is a cutting tool for cutting the roll 1. The cutting blade 12 is structured from a hard material such as, for example, a ceramic tip, a diamond tip, a carbide tip, or the like.

The PZT stage 13 holds the cutting blade 12. The PZT stage 13 comprises a PZT (lead zirconate titanate) piezoelectric element, to cause the cutting blade 12 to reciprocate in the radial direction of the roll 1 through the PZT piezoelectric element extending and retracting depending on the voltage of a driving signal. Consequently, the cutting blade 12 can be caused, by the PZT stage 13, to reciprocate in the radial direction of the roll 1. Note that the driving means for driving the cutting blade 12 are not limited to being a PZT piezoelectric element.

Figure 2A:
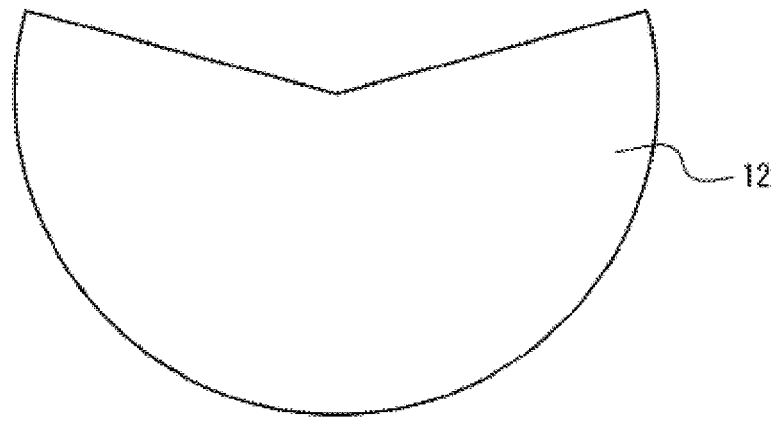
FIG. 2A is a diagram wherein the cutting blade depicted in FIG. 1 is viewed from the front.
Figure 2B:
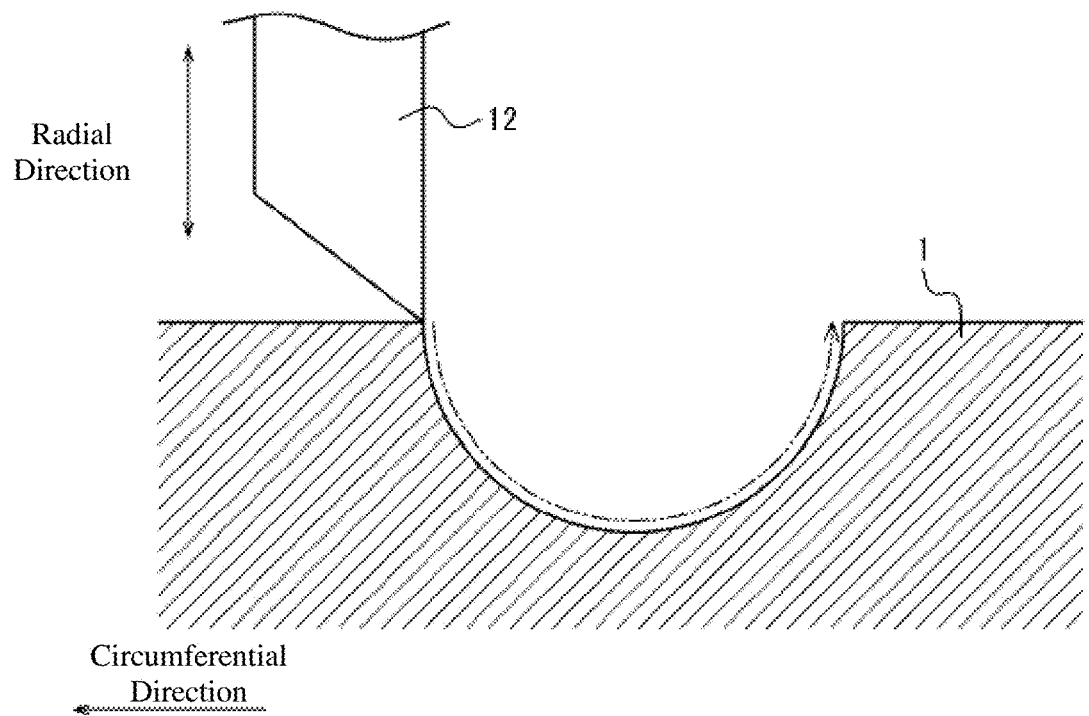
FIG. 2B is a diagram wherein the cutting blade depicted in FIG. 1 is viewed from the side.

FIG. 2A is a diagram wherein the cutting blade 12 is viewed from the front. Additionally, FIG. 2B is a diagram wherein the cutting blade 12 is viewed from the side.

As depicted in FIG. 2A, the cutting blade 12 has a circular shape. The cutting blade 12 is arranged so that the front face of the cutting blade 12 faces the circumferential direction of the roll 1. As described above, the roll 1 rotates in the circumferential direction. The cutting blade 12, which faces the roll 1, is caused to reciprocate in the radial direction of the roll 1, to cause the cutting blade 12 to move in what appears to be a semicircular shape, as with the dotted line-arrow shown in FIG. 2B, to cut the roll 1. A bottom face part of a circle that has the same curvature as the curvature of the circle part of the cutting blade 12 is formed in the cut holes through cutting by the cutting blade 12.

Returning again to FIG. 1, the cutting tool stage 14 holds the PZT stage 13 and moves in the cutting axial direction (the radial direction of the roll 1), and the feeding axial direction (the axial direction of the roll 1). Moving the cutting tool stage 14 causes the PZT stage 13 and the cutting blade 12, which are held on the cuttings tool stage 14, to also move in the cutting axial direction and the feed axial direction. The PZT stage 13 causes the cutting blade 12 to reciprocate in the radial direction of the roll 1 to cut the roll 1 as the roll 1 rotates, and also the PZT stage 13 is moved in the axial direction of the roll 1, enabling formation of cutting holes across the entire surface of the roll 1.

The signal generating unit 15 generates a control waveform that indicates the movement pattern of the cutting blade 12 to cause the cutting blade 12 to move in the reciprocating motion at a position corresponding to a prescribed cutting location on the surface of the roll 1, based on a signal outputted from the rotary encoder 11a. The generation of the control waveform by the signal generating unit 15 will be explained in reference to FIG. 3.

As described above, the rotary encoder 11a outputs a trigger signal each time the rotary position of the roll 1 reaches a prescribed reference position, once per rotation. Specifically, the rotary encoder 11a outputs, as a trigger signal, a pulse-shaped signal that rises each time the rotary position of the roll 1 reaches the prescribed reference position, once per rotation, as depicted in FIG. 3, for example. Additionally, the rotary encoder 11a outputs, as a pulse signal, a pulse-shaped signal that rises each time the roll 1 rotates by a prescribed amount, as depicted in FIG. 3. The rotary encoder 11a outputs, as a pulse signal, a pulse-shaped signal that rises with, for example, each rotational movement wherein one rotation of the roll 1 is divided by 1.44 million.

The signal generating unit 15 counts pulse signals using the output timing of the trigger signal (the timing with which the trigger signal rises) as a reference. Given this, the signal generating unit 15 generates control waveforms in response to the pulse signal count. Counting pulse signals using the output timing of the trigger signal as a reference makes it possible to identify the rotary position of the roll 1 from the prescribed reference position. This makes it possible to repeatedly cut prescribed cutting locations of the roll 1 accurately, by generating a control waveform depending on the pulse signal count, with the output timing of the trigger signal as a reference.

Explaining the details of the control waveform generation by the signal generating unit 15, the signal generating unit 15 generates a control waveform so that the cutting depth in one cutting process is smaller than the cutting depth in a cutting process immediately prior to the cutting process.

As shown above, for this embodiment, by generating the control waveform based on a signal outputted from the rotary encoder 11a and by moving the cutting blade 12 in the reciprocating motion based on the control waveform to cutting the roll 1, the prescribed cutting location is accurately cut. This enables the same cutting location to be cut accurately even if a cutting process, for cutting once or a plurality of times with a prescribed cutting depth, is repeated a plurality of times.

Figure 4:
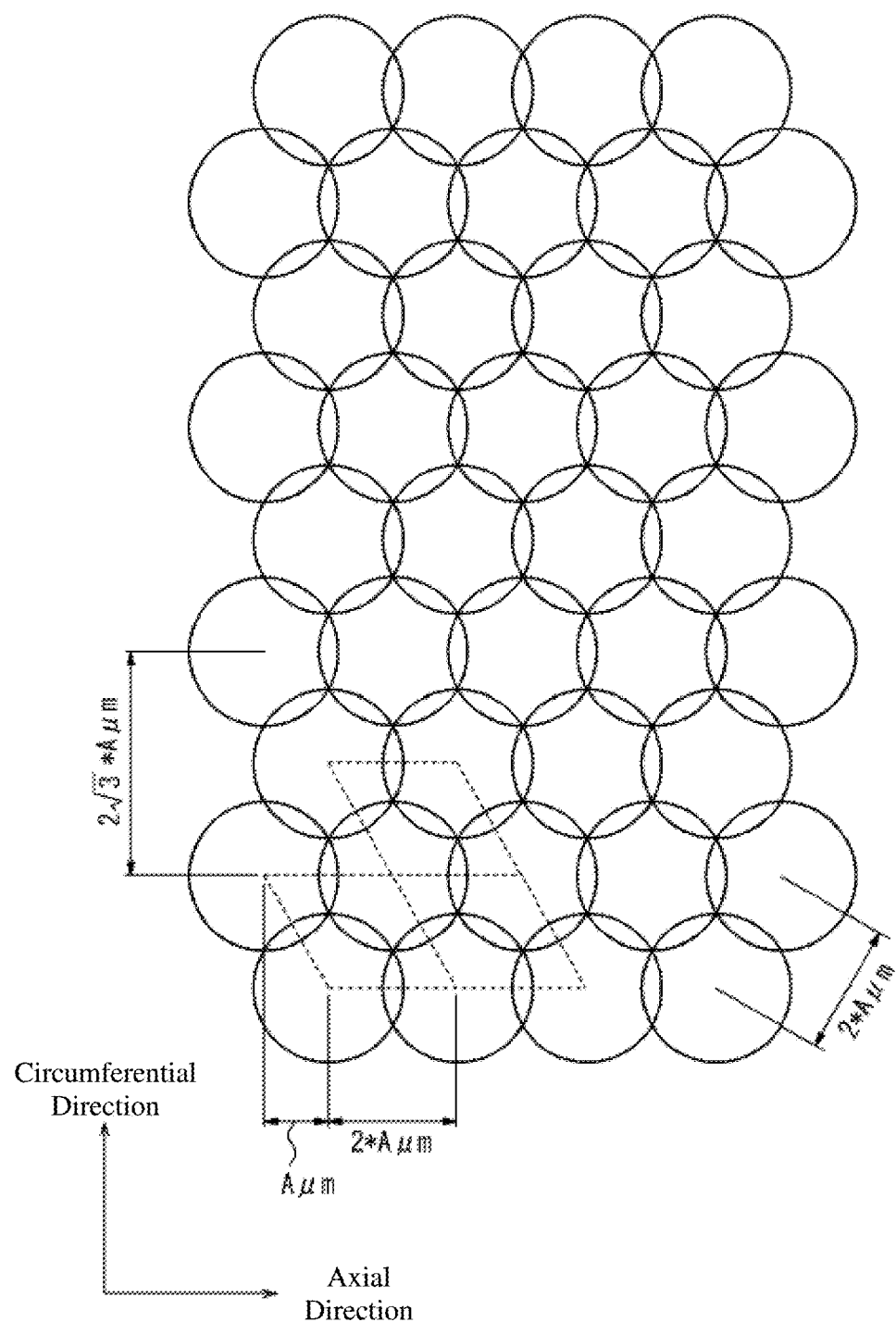
FIG. 4 is a diagram depicting an example of a layout pattern for cut holes on the roll depicted in FIG. 1.

FIG. 4 is a diagram showing an example of a layout pattern of cut holes which are to be formed onto the roll 1.

As depicted in FIG. 4, let us consider a layout pattern wherein diamond shapes, having one edge and another edge that is opposite thereof are parallel in the axial direction and the other two edges are inclined by about 30° in the circumferential direction, are laid out continuously in the axial direction and the circumferential direction. The cut holes are arranged centered on the four corners of each of the diamond shapes. The two cut holes that are centered on both ends of the edges that are parallel to the axial direction partially overlap. The two cut holes that are centered on both ends of the edges that are inclined in the circumferential direction partially overlap. When the axial-direction distance between centers of the two cut holes that are centered on both ends of an edge that is angled in the circumferential direction is defined as A µm, the distance between centers of the two cut holes that are adjacent in the circumferential direction will be, for example, $2\sqrt{3} \times A$ µm. Moreover, the distance between centers of two cut holes that are neighboring in the axial direction will be, for example, $2 \times A$ µm. Additionally, the distance between the centers of the two cut holes that are centered on both ends of the edge that is inclined in the circumferential direction will be, for example, $2 \times A$ µm.

The signal generating unit 15 generates a control waveform so as to form cut holes in the roll 1 according to a layout pattern for cut holes explained in reference to FIG. 4. Namely, the signal generating unit 15 generates a control waveform so that the roll 1 will be cut by the cutting blade 12 at a rotating position of roll 1 corresponding to each of the cut holes.

Returning again to FIG. 1, the controlling unit 16 causes the cutting blade 12 to reciprocate in the radial direction of the roll 1, following the control waveform generated by the signal generating unit 15, to cut the roll 1. Specifically, the controlling unit 16 causes the cutting blade 12 to reciprocate in the radial direction of the roll 1 based on the control waveform. Furthermore, the controlling unit 16 causes the cutting tool stage 14 to move in the radial direction of the roll 1 so that a cutting process for cutting a prescribed cutting location of the roll 1 once or a plurality of times, with a prescribed cutting depth, by the cutting blade 12 that moves in the reciprocating motion will be carried out a plurality of times. Through this, the roll 1 will be cut to a prescribed depth by the cutting blade 12 that moves in the reciprocating motion. The cutting depth and number of cuts in each individual cutting process is inputted, for example, in advance into the controlling unit 16. The controlling unit 16 generates, and outputs to the amplifying unit 17, a driving signal for driving the PZT stage 13.

An example will be used wherein a cut hole is formed through a cutting process for cutting x times with a cutting depth of d1 and a cutting process for cutting y times with a cutting depth of d2. In this case, the controlling unit 16 drives the PZT stage 13 in accordance with the control waveform to cause the cutting blade 12 to reciprocate in the radial direction of the roll 1. Given this, the controlling unit 16 moves the cutting tool stage 14 sequentially so that the roll 1 will be cut x times with the cutting depth d1 by the cutting blade 12 that moves in the reciprocating motion. Next the controlling unit 16 sequentially moves the cutting tool stage 14 so that the roll 1 will be cut y times, with a cutting depth of d2, by the cutting blade 12 that moves in the reciprocating motion.

The amplifying unit 17 amplifies, and outputs to the PZT stage 13, the driving signal that was outputted from the controlling unit 16. The PZT stage 13 is driven by the driving signal after amplification, so that the cutting blade 12 will reciprocate in the radial direction of the roll 1, so that the roll 1 will be cut.

Figure 5:
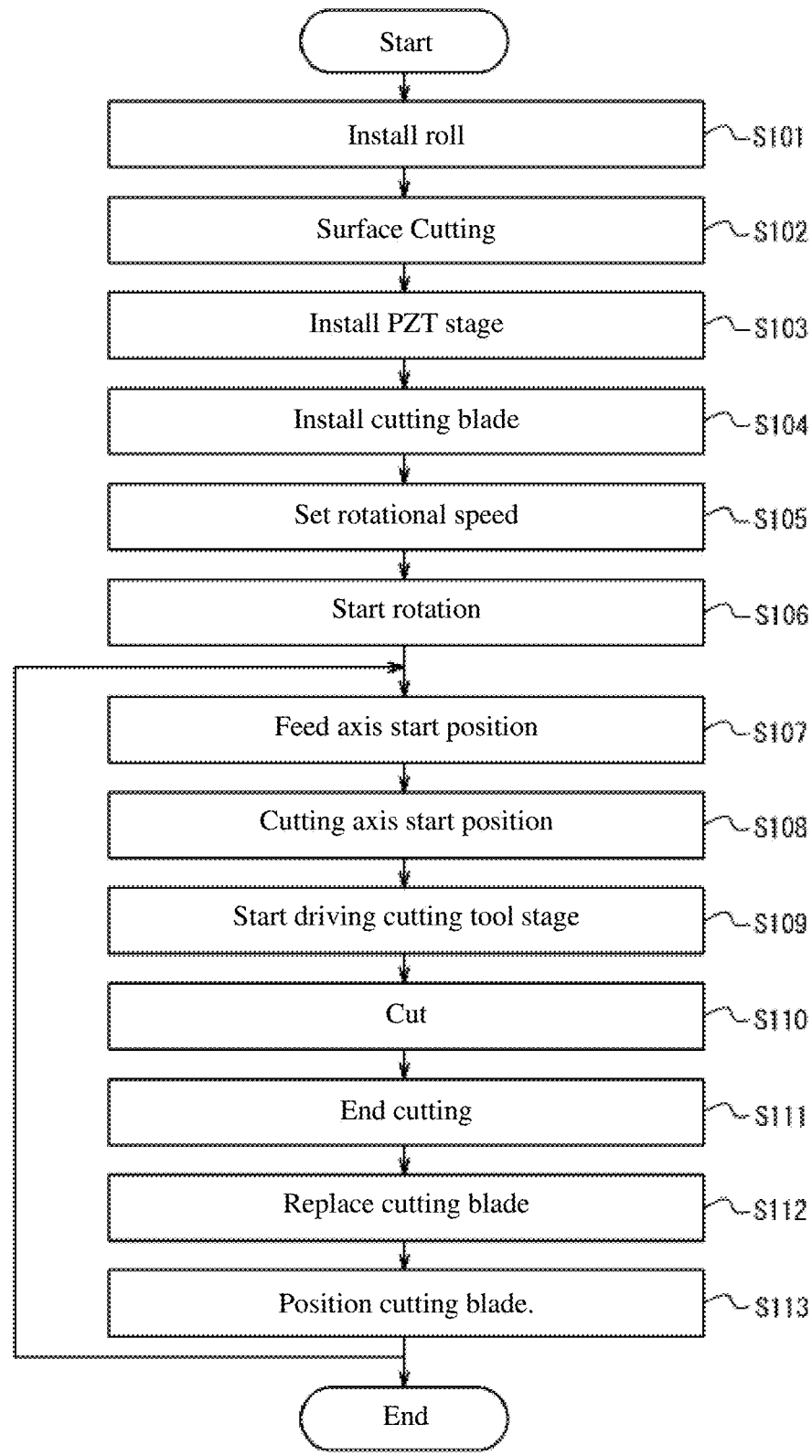
FIG. 5 is a flowchart showing an example of operation of the roll mold manufacturing apparatus that is depicted in FIG. 1.

FIG. 5 is a flowchart depicting an example of operation of the roll mold manufacturing apparatus 10 according to the present embodiment.

First, the roll 1 is placed in the rotating device 11 (Step S101).

Next, surface cutting for planarizing the plating layer on the surface of the roll 1 is carried out on the roll 1 (Step S102).

Next, the PZT stage 13 is attached to the cutting tool stage 14 (Step S103).

The cutting blade 12 is then attached to the PZT stage 13 (Step S104).

The rotational speed of the rotating device 11 is then set (Step S105), and the rotating device 11 starts rotating the roll 1 at the rotary speed that has been set (Step S106).

Next, the position of the cutting tool stage 14 is set to the starting position for the feed axial direction and the starting position for the cutting axial direction (Steps S107 and S108), and driving of the cutting tool stage 14 is started (Step S109).

The roll 1 is cut by the cutting blade 12 reciprocating in the radial direction of the roll 1 following the control waveform generated by the signal generating unit 15 (Step S110).

The cutting tool stage 14 moves to the ending position in the feed axial direction, and the cutting process for cutting the prescribed cutting location with the prescribed cutting depth is repeated a plurality of times to complete the cutting of the cut hole (Step S111).

When the cutting blade 12 becomes worn and there is the need to replace the cutting blade 12, the cutting blade 12 is replaced (Step S112), and positioning of the cutting blade 12 is carried out (Step S113), after which the processes from Step S107 through Step S111 are repeated.

Figure 6:
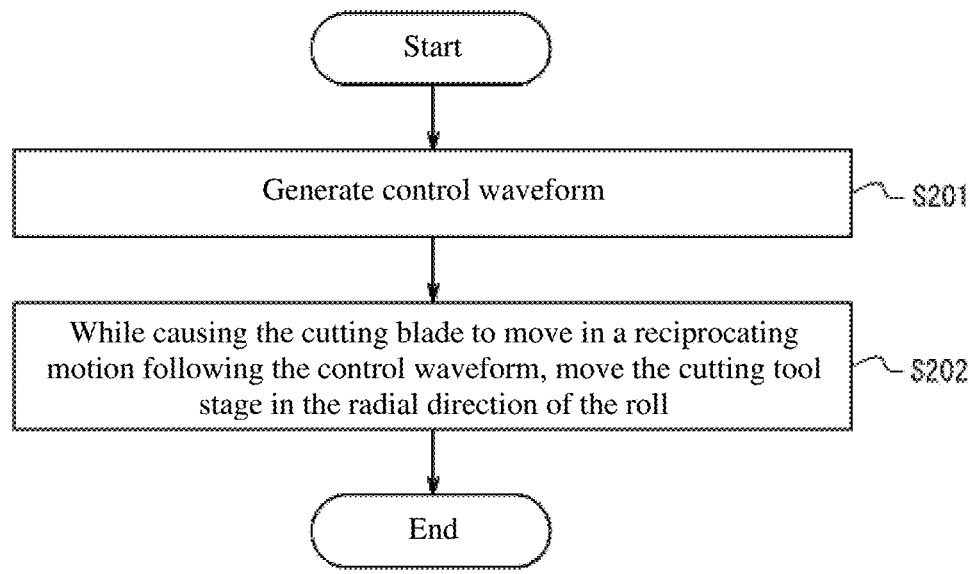
FIG. 6 is a flowchart for explaining a roll mold manufacturing method in the roll mold manufacturing apparatus that is depicted in FIG. 1.

The roll mold manufacturing method in the roll mold manufacturing apparatus 10 according to the present embodiment will be explained next in reference to the flowchart shown in FIG. 6. In FIG. 6, generation of the control waveform that indicates the movement pattern of the cutting blade 12, and cutting by the cutting blade 12 in accordance with the control waveform, will be explained in particular.

The signal generating unit 15 generates a control waveform for causing the cutting blade 12 to reciprocate in the radial direction of the roll 1 at a location corresponding to a prescribed cutting location on the surface of the roll 1, based on a signal that depends on the rotational position of the roll 1, outputted from the rotary encoder 11a (Step S201).

The controlling unit 16 causes the cutting blade 12 to reciprocate in the radial direction of the roll 1 following the control waveform generated by the signal generating unit 15. Moreover, the controlling unit 16 causes the cutting tool stage 14 to move in the radial direction of the roll 1 so that a cutting process wherein a prescribed cutting location of the roll 1 will be cut once or a plurality of times with a prescribed cutting depth by the cutting blade 12 that moves in the reciprocating motion will be carried out at a plurality of times (Step S202). Specifically, the controlling unit 16 generates, and outputs to the amplifying unit 17, a driving signal for the PZT stage 13 so that the cutting blade 12 will move in the radial direction of the roll 1 following the control waveform. Additionally, the controlling unit 16 causes the cutting tool stage 14 to move in the radial direction of the roll 1 so that the roll 1 will be cut with the cutting depth and the number of times of the cutting process, which have been set in advance.

In this way, the roll mold manufacturing method according to the present embodiment includes: a generating step for generating a control waveform that indicates a movement pattern of the cutting blade 12 for causing the cutting blade 12 to move in the reciprocating motion, in the radial direction of the roll 1, at a position corresponding to a prescribed cutting location of the surface of the roll 1, based on a signal outputted from the rotary encoder 11a; and a cutting step wherein the cutting tool stage 14 is caused to move in the radial direction of the roll 1 so that the cutting blade 12 is caused to reciprocate in the radial direction of the roll 1 in accordance with the control waveform and that a cutting process in which a prescribed cutting location will be cut once or a plurality of times with a prescribed cutting depth by the cutting blade 12 that moves in the reciprocating motion will be carried out a plurality of times. In the cutting step, the cutting tool stage 14 is caused to move in the radial direction of the roll 1 so that the cutting depth in the cutting process will be smaller than the cutting depth in the cutting process immediately preceding the cutting process.

Generating the control waveform based on a signal outputted from the rotary encoder 11a and cutting the roll 1 by controlling the reciprocating motion of the cutting blade 12 based on the control waveform enable the prescribed cutting location to be cut accurately. This enables the same cutting location to be cut accurately even if a cutting process, for cutting once or a plurality of times with a prescribed cutting depth, is repeated a plurality of times, making it possible to manufacture a roll mold wherein cut holes are formed with prescribed depths by accurately cutting the prescribed cutting locations a plurality of times. Moreover, making the cutting depth being shallower the later the cutting process enables suppression of the production of burrs through cutting.

EXAMPLES

The present invention will be explained in greater detail next through the use of examples; however, the present invention is not limited to the examples set forth below.

Example 1

A roll was prepared by plating Ni—P onto the surface of SUS 304. The roll diameter was 130 mm, and the roll length was 250 mm.

The roll that was prepared was next placed in a roll mold apparatus according to the present embodiment, and planarization machining was carried out on the Ni—P plating layer on the surface of the roll. After the planarization machining, the roll was cut to form cut holes. A cutting blade with a tip end radius of 0.1 mm, having a diamond tip that is circular when viewed from the front, was used for the cutting blade. The rotational speed of the roll was 0.5 $min^{-1}$ Cutting of the roll was carried out three times with a cutting depth of 5 μm, once with a cutting depth of 3 μm, and three times with a cutting depth of 1 μm. That is, after a cutting process (a first cutting process) wherein cutting was performed three times with a cutting depth of 5 μm, a cutting process (a second cutting process) wherein cutting was carried out once with a cutting depth of 3 μm, which is less than the cutting depth (5 μm) in the first cutting process. Moreover, after the second cutting process, a cutting process (a third cutting process) was carried out for cutting three times with a cutting depth of 1 μm, which is less than the cutting depth (3 μm) in the second cutting process. Through the first through third cutting processes, described above, a roll mold was manufactured wherein 21 μm (=5 μm×3+3 μm×1+1 μm×3) cut holes are formed in the roll. The positions of the cutting holes were in line with the layout pattern in FIG. 4.

Example 2

In this example, the rotation of the roll was set to 1.0 $min^{-1}$ Other conditions are the same as the conditions of Example 1.

Comparative Example 1

In this comparative example, the roll was cut seven times at a depth of 3 μm. In other words, the roll was formed with the cutting depth of 21 μm (=3 μm×7). Other conditions are the same as the conditions of Example 1.

Comparative Example 2

In this comparative example, the roll was cut four times at a depth of 5 μm. In other words, the roll was formed with the cutting depth of 20 μm (=5 μm×4). Other conditions are the same as the conditions of Example 1.

Comparative Example 3

In this comparative example, the roll was cut to a depth of 20 μm. However, in this example, when the roll is cut at a depth of 20 μm, the cutting blade was chipped, and it was difficult to create the cutting holes.

A microlens array was next manufactured using the roll mold according to Examples 1 and 2. The microlens array was manufactured explained below. That is, uncured acrylic UV-curable resin was dispensed from above a substrate made from PET (polyethylene terephthalate) to form a curable resin layer. The roll mold that was manufactured was next pressed against the curable resin layer that was formed, and, in this state, the curable resin layer was cured through exposing the curable resin layer to UV radiation. After curing of the curable resin layer, the cured curable resin layer was peeled from the roll mold, to manufacture the microlens array.

The surfaces of the roll molds according to Examples 1 and 2 and Comparative Examples 1 and 2 were next examined using a microscope. Moreover, the surfaces of the microlens array manufactured using these roll molds were examined using an SEM (Scanning Electron Microscope).

Figure 7A:
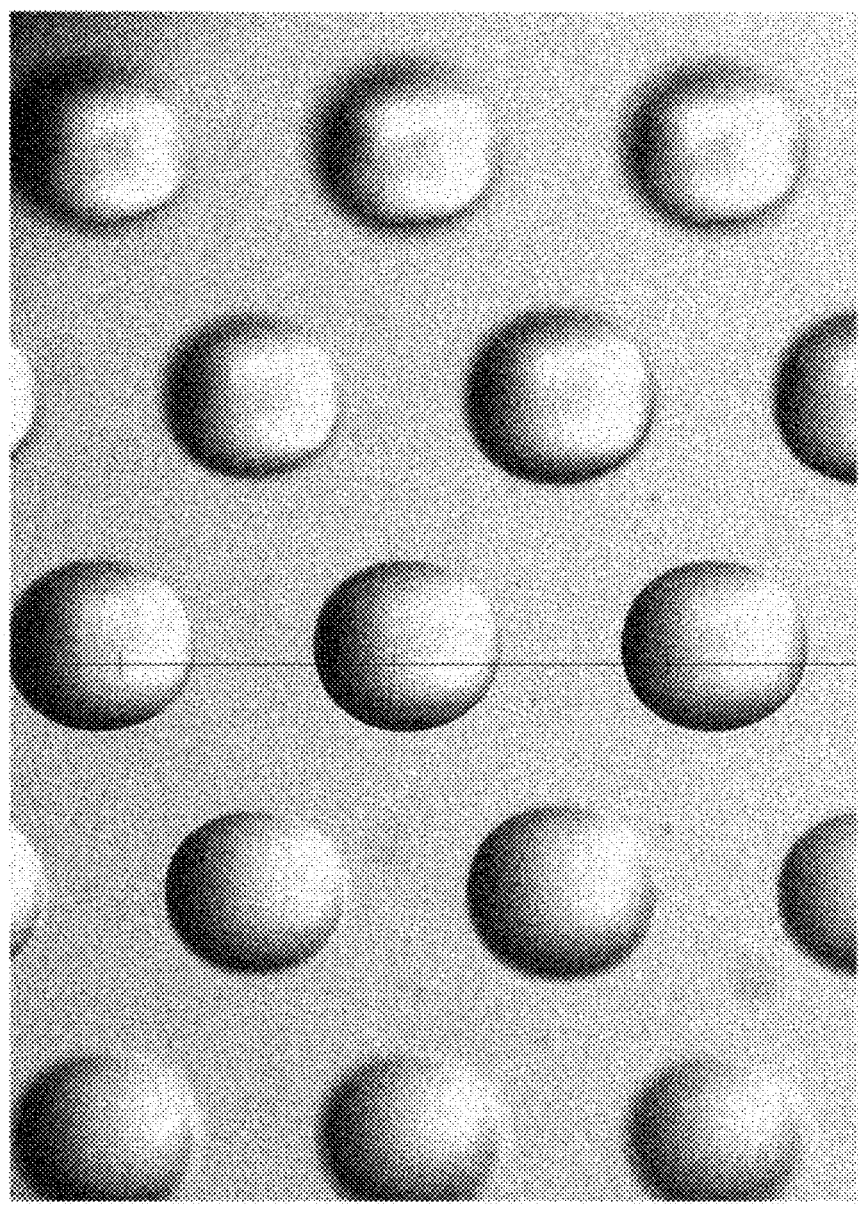
FIG. 7A is a photograph of the surface of the roll after cutting a prescribed number of times.
Figure 7B:
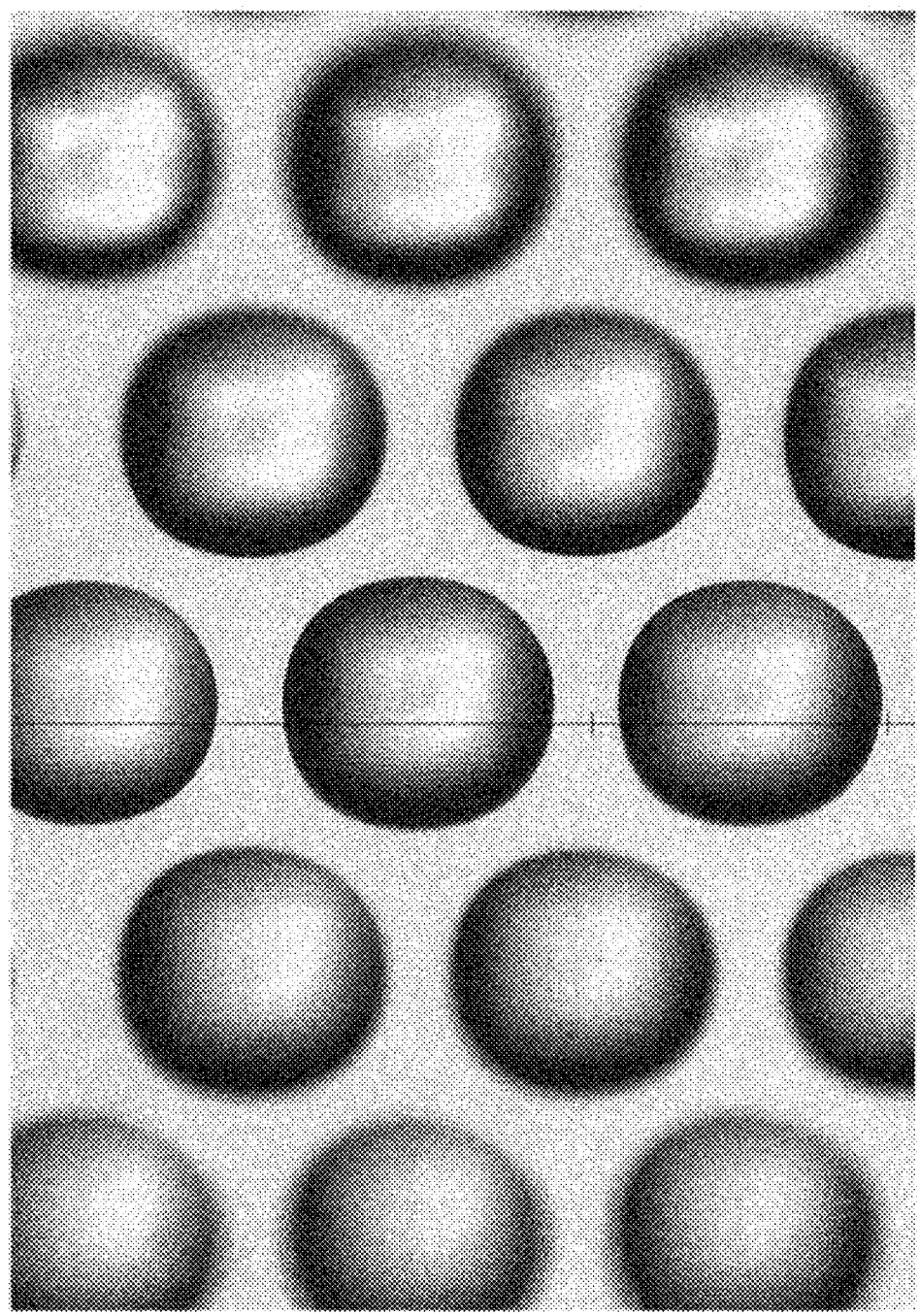
FIG. 7B is a photograph of the surface of the roll after cutting the roll, depicted in FIG. 7A, one more time.

FIG. 7A is a photograph, through a microscope, of the surface of the roll after the prescribed cutting locations were cut the prescribed number of times. FIG. 7B is a photograph, through a microscope, of the surface of the roll after the roll shown in FIG. 7A was cut one more time. FIG. 7A and FIG. 7B have the same image magnification ratio.

As shown in FIG. 7A in FIG. 7B, it can be understood that cut holes with large diameters and depths were formed through repeated cutting.

Figure 8A:
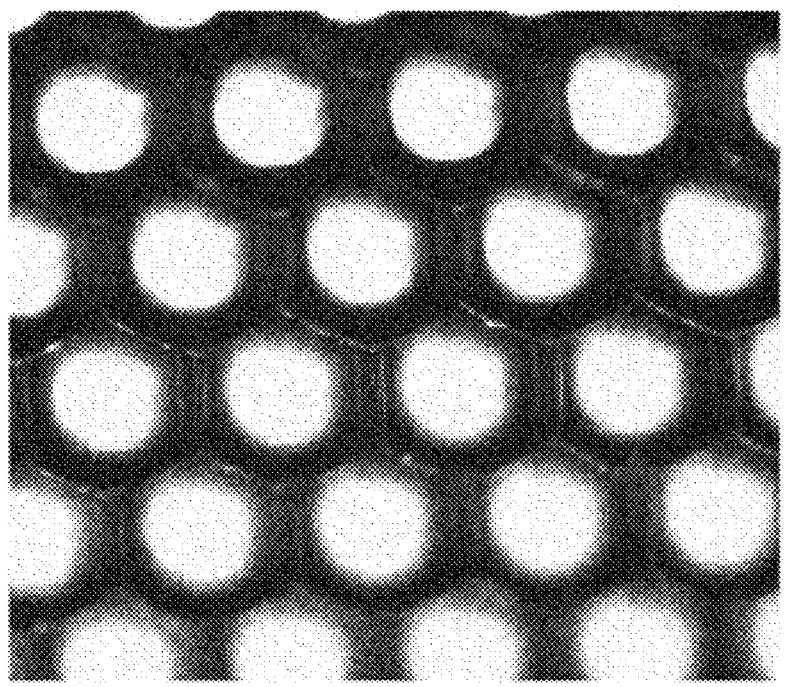
FIG. 8A is a photograph of the surface of a roll mold according to Example 1
Figure 8B:
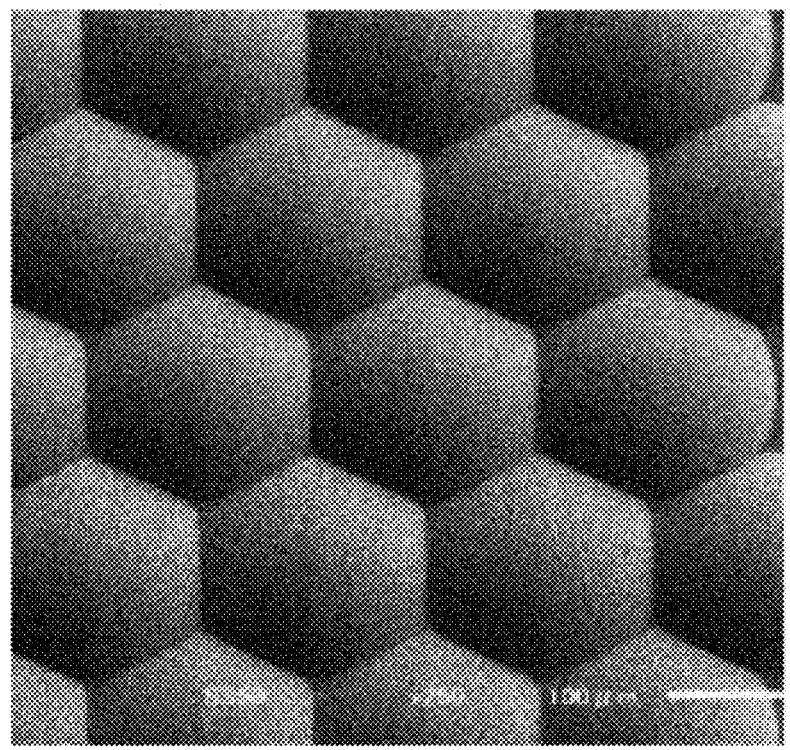
FIG. 8B is a photograph of the surface of a microlens array manufactured using the roll mold according to Example 1.
Figure 9A:
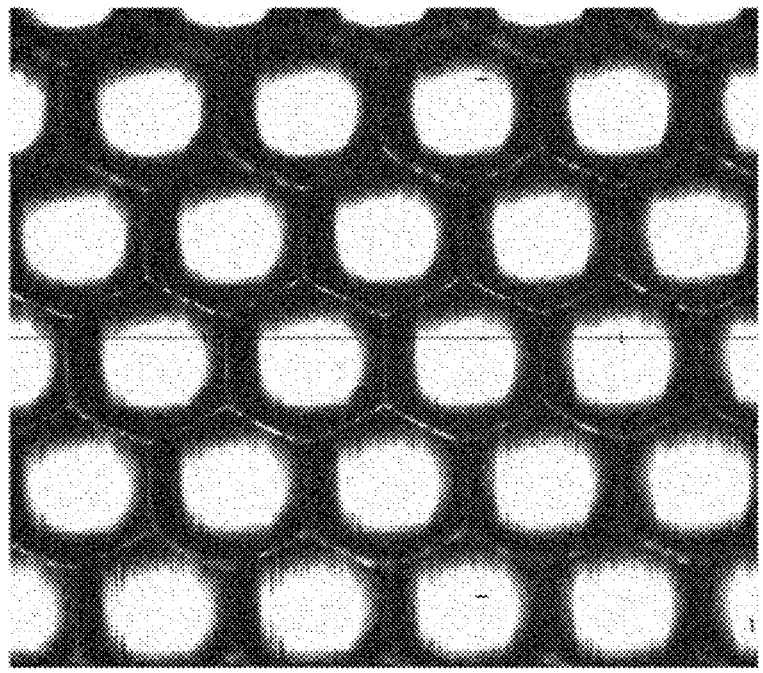
FIG. 9A is a photograph of the surface of a roll mold according to Example 2.
Figure 9B:
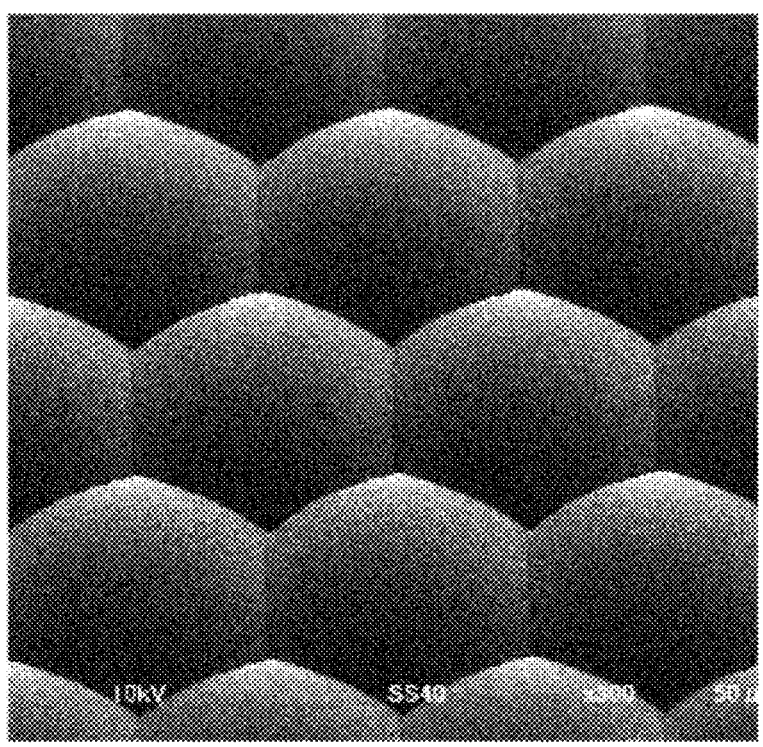
FIG. 9B is a photograph of the surface of a microlens array manufactured using the roll mold according to Example 2.
Figure 10A:
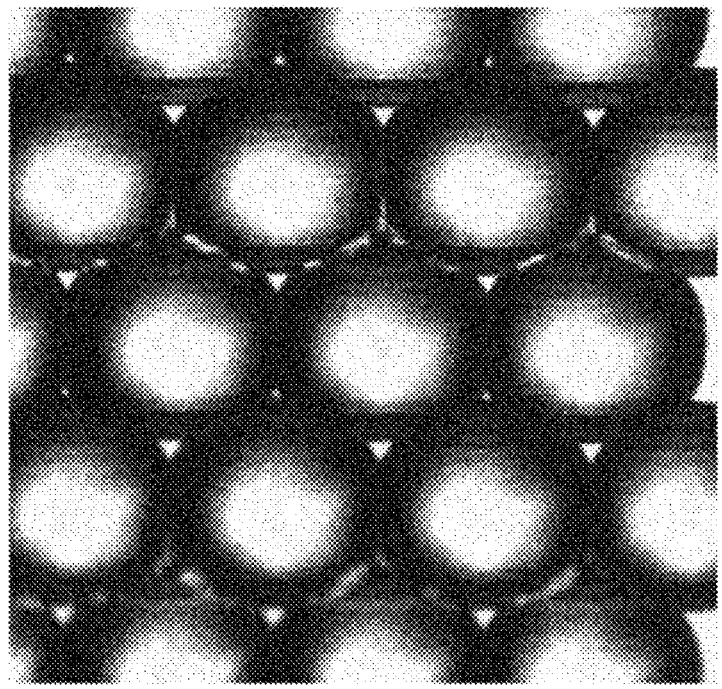
FIG. 10A is a photograph of the surface of a roll mold according to Comparative Example 1.
Figure 10B:
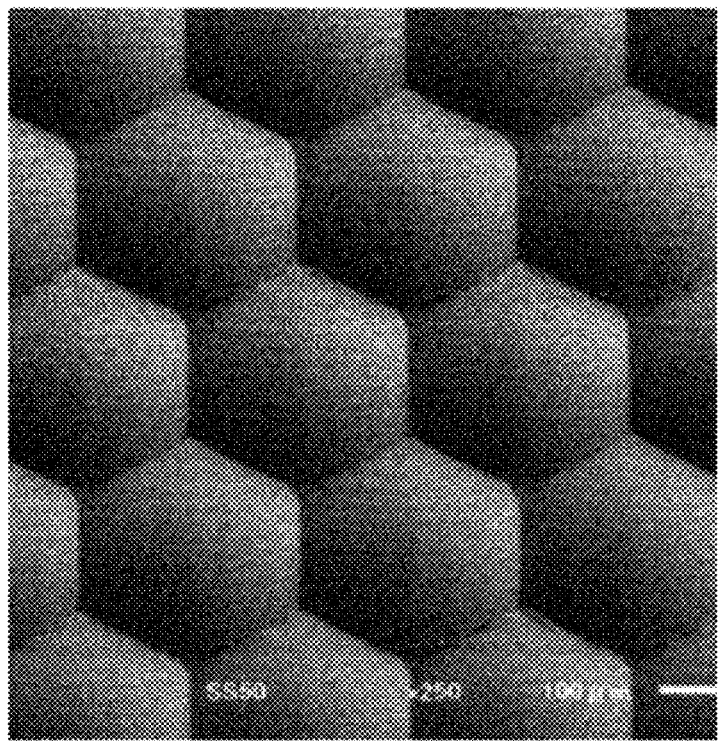
FIG. 10B is a photograph of the surface of a microlens array manufactured using the roll mold according to Comparative Example 1.
Figure 11A:
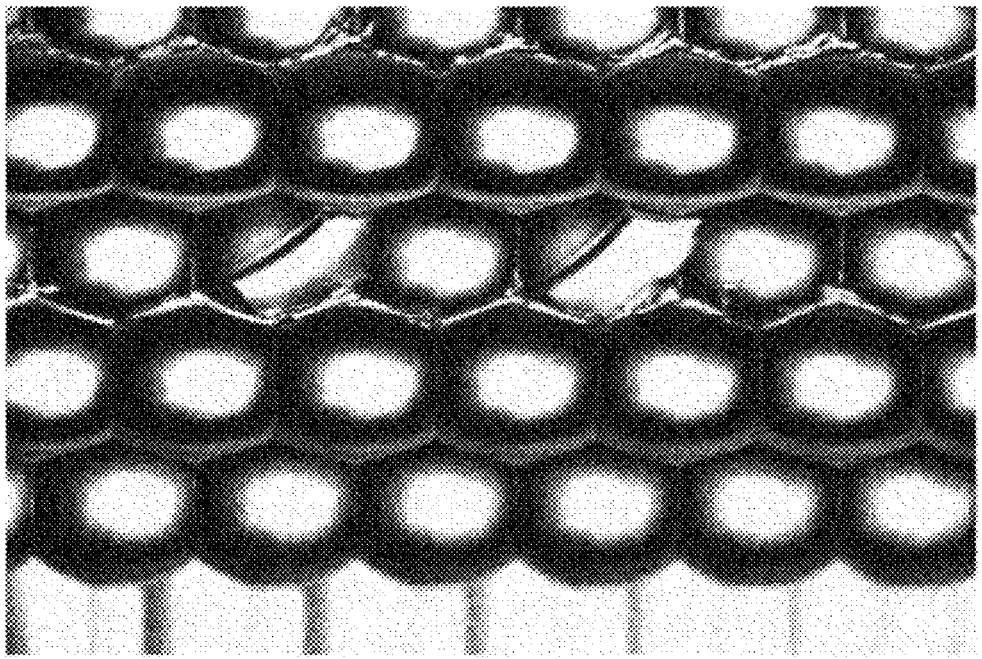
FIG. 11A is a photograph of the surface of a roll mold according to Comparative Example 2.
Figure 11B:
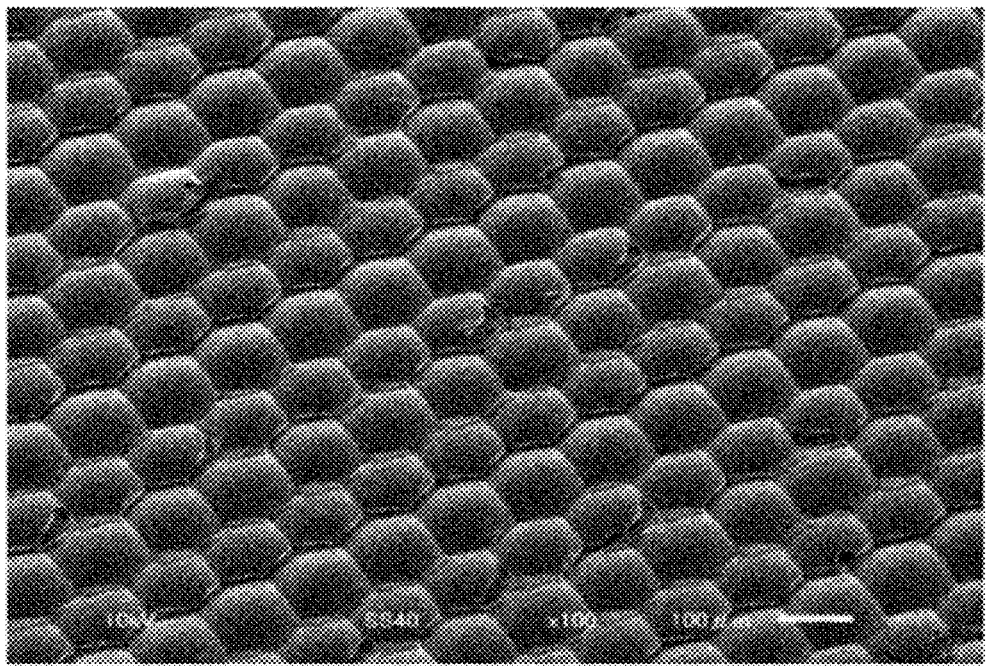
FIG. 11B is a photograph of the surface of a microlens array manufactured using the roll mold according to Comparative Example 2.

FIG. 8A and FIG. 9A are photographs, through a microscope, of the surfaces of the roll molds according to Examples 1 and 2, respectively. FIG. 8B and FIG. 9B are photographs, through SEM, of the surfaces of the microlens arrays manufactured using the roll molds according to Examples 1 and 2, respectively. FIG. 10A and FIG. 11A are photographs, through a microscope, of the surfaces of the roll molds according to Comparative Examples 1 and 2, respectively. FIG. 10B and FIG. 11B are photographs, through SEM, of the surfaces of the microlens arrays manufactured using the roll molds according to Comparative Examples 1 and 2, respectively.

As shown in FIG. 8B and FIG. 9B, with the roll molds according to Examples 1 and 2, a plurality of cut holes were formed in a so-called honeycomb structure, wherein cut holes in a hexagonal shape, in the plan view, are laid out without gaps. As shown in FIG. 8A and FIG. 9A, no burrs were produced in the mold roll according to Example 1 or 2. Thus, as shown in FIG. 8B and FIG. 9B, no structures corresponding to burrs were formed in the microlens array manufactured using the roll mold according to Example 1 or Example 2.

As shown in FIG. 10B and FIG. 11B, with the roll molds according to Comparative Examples 1 and 2, a plurality of cut holes were formed in a so-called honeycomb structure, wherein cut holes in a hexagonal shape, in the plan view, are laid out without gaps. As shown in FIG. 10A and FIG. 11A, burrs were produced in the mold rolls according to Comparative Examples 1 and 2. Thus, as shown in FIG. 10B and FIG. 11B, structures corresponding to burrs were formed in the microlens array manufactured using the roll molds according to Comparative Examples 1 and Example 2.

Figure 12A:
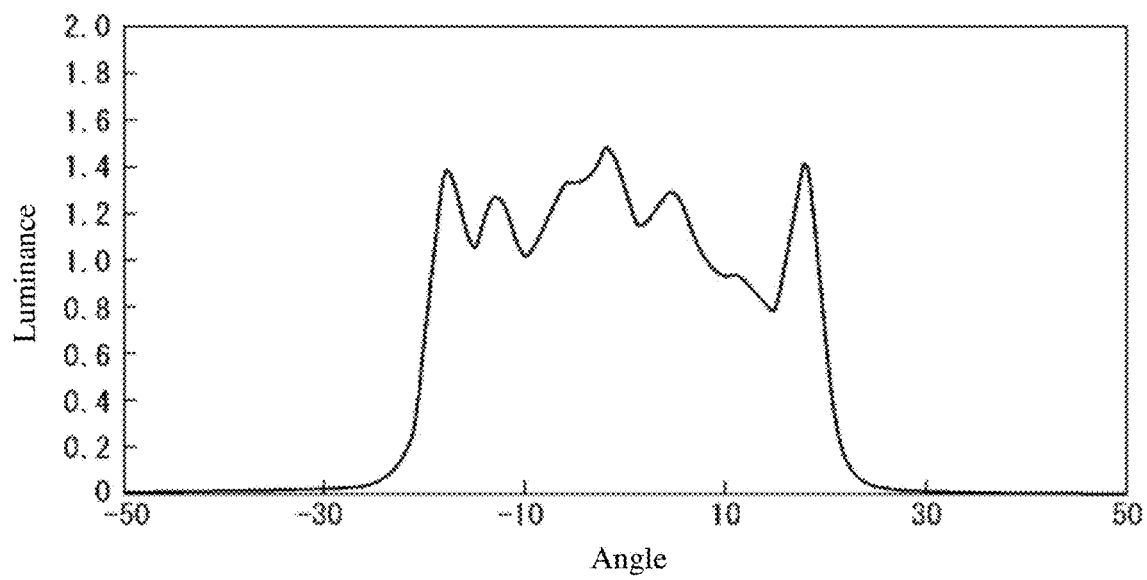
FIG. 12A is a diagram depicting light distribution characteristics of the microlens array manufactured using the roll mold according to Example 1.
Figure 12B:
FIG. 12B is a diagram depicting light distribution characteristics of the microlens array manufactured using the roll mold according to Comparative Example 2.

FIG. 12A is a diagram which shows light distribution characteristics of the microlens array manufactured using the roll mold according to Example 1. FIG. 12B is a diagram which shows light distribution characteristics of the microlens array manufactured using the roll mold according to Comparative Example 2. In FIG. 12A and FIG. 12B, the horizontal axis is an angle and the vertical axis is luminance.

As shown in FIG. 12A and FIG. 12B, in the microlens array manufactured using the roll mold according to Example 1, in which no burrs were created, higher luminance was obtained in almost all angles, compared with in the microlens array manufactured using the roll mold according to Comparative Example 2, in which burrs were created. Therefore, it was found that the microlens array manufactured using the roll mold according to Example 1 has better light distribution characteristics than the microlens array manufactured using the roll mold according to Comparative Example 2.

The signal generating unit 15 and the controlling unit 16 are structured through a computer including, for example, a memory and a processor. When the signal generating unit 15 and the controlling unit 16 are structured from a computer, the signal generating unit 15 and the controlling unit 16 are achieved through a processor reading out and executing a program, according to the present embodiment, that is stored in memory.

A program describing the processing details by which each of the functions of the signal generating unit 15 and the controlling unit 16 is achieved may be recorded on a computer-readable recording medium. The use of such a recording medium enables the program to be installed in a computer. Here the recording medium on which the program is recorded may be a non-transitory recording medium. Although there is no particular limitation on the non-transitory recording medium, it may be, for example, a recording medium such as a CD-ROM or a DVD-ROM.

The present invention is not limited to the structures specified in the various embodiments set forth above, but rather a variety of modifications is possible in a range that does not deviate from the spirit and intent of the invention described in the claims. For example, the functions included in the various structural portions, and the like, may be rearranged so as to have no logical inconsistencies, a plurality of structural portions, or the like, may be combined into one, or may be divided.

LIST OF REFERENCE NUMERALS

10: Roll Mold Manufacturing Apparatus
11: Rotating Device
11a: Rotary Encoder
12: Cutting Blade
13: PZT Stage
14: Cutting Tool Stage
15: Signal Generating Unit
16: Controlling Unit
17: Amplifying Unit

The invention claimed is:

1. A method for manufacturing a roll mold by cutting a roll having a cylindrical or circular column shape provided on a rotating device which comprises: a supporter configured to support an axis of the roll; and a rotator configured to rotate the roll supported by the supporter in a circumferential direction of the roll, the method comprising:
outputting a signal from a rotary encoder connected to the rotating device, the signal corresponding to a rotary position of the roll;
generating a control waveform, a waveform of the control waveform corresponding to a position of a cutting blade held by a cutting tool in a radial direction of the roll at each rotary position determined by the signal; and
moving the cutting blade in the radial direction of the roll such that while the roll is rotated by the rotating device, the cutting blade reciprocates in a radial direction of the roll in accordance with the control waveform to make a plurality of cuts on a surface of the roll, wherein:
at each of a plurality of predetermined locations of the roll, a predetermined number of cuts of predetermined depth are made based on the control waveform; and
in multiple cuts made at a predetermined location, each subsequent cut will have a smaller depth than a preceding cut.

2. The method according to claim 1, wherein:
the signal in accordance with the rotary position of the roll comprises a trigger signal that is outputted each time the rotary position of the roll reaches a predetermined reference position, once per rotation, and a pulse signal that is outputted each time the roll rotates a predetermined angle; and
the pulse signals are counted in reference to a timing with which the trigger signal rises to obtain a pulse signal count, and the control waveform is generated in accordance with the pulse signal count.

3. A roll mold manufacturing apparatus, comprising:
a rotating device comprising: a supporter configured to support an axis of a roll having a cylindrical or circular column shape in a circumferential direction, and a rotator configured to rotate the roll in a circumferential direction,
a rotary encoder connected to the rotating device, configured to output a signal corresponding to a rotary position of the roll;
a cutting tool stage holding a cutting blade, the cutting tool stage being movable in a radial direction of the roll;
a signal generating unit configured to generate a control waveform, a waveform of the control waveform corresponding to a position of the cutting blade, in a radial direction of the roll, at each rotary position determined by the signal; and
a controlling unit configured to move the cutting tool stage in the radial direction of the roll such that, while the rotating device rotates the roll, the cutting blade reciprocates in the radial direction of the roll in accordance with the control waveform to make a plurality of cuts on a surface of the roll,
wherein:
the plurality of cuts comprises a predetermined number of cuts of predetermined depth at each of a plurality of predetermined locations of the roll, based on the control waveform; and
in multiple cuts made at a predetermined location, each subsequent cut will have a smaller depth than a preceding cut.

4. A non-transitory computer readable medium storing instructions that, when executed by a processor, cause the processor to perform operations, the operations comprising:
receiving a signal outputted from a rotary encoder, the signal corresponding to a rotary position of a roll having a cylindrical or circular column shape;
generating a control waveform, a waveform of the control waveform corresponding to a position of a cutting blade held by a cutting tool in a radial direction of the roll at each rotary position determined by the signal; and
causing the cutting tool stage to move in the radial direction of the roll such that, while the roll is rotated, the cutting blade reciprocates in the radial direction of the roll in accordance with the control waveform, thereby making a plurality of cuts on a surface of the roll, wherein:
at each of a plurality of predetermined locations of the roll, a predetermined number of cuts of predetermined depth are made based on the control waveform; and in multiple cuts made at a predetermined location, each subsequent cut will have a smaller depth than a preceding cut.

5. A roll mold made by the method of claim 1.

6. The method according to claim 1, wherein the cutting blade has a circular shape.

7. The method according to claim 1, wherein the roll comprises: a base portion; and a machinable layer provided on a surface of the base portion.

8. The method according to claim 1, wherein the cutting blade comprises at least one selected from the group consisting of a ceramic tip, a diamond tip, and a carbide tip.

9. The method according to claim 1, further comprising planarizing the surface of the roll before cutting the predetermined locations of the roll.

10. The roll mold manufacturing apparatus according to claim 3, wherein the cutting blade has a circular shape.

11. The roll mold manufacturing apparatus according to claim 3, wherein the cutting blade comprises at least one selected from the group consisting of a ceramic tip, a diamond tip, and a carbide tip.

* * * * *